Dec. 7, 1937.  M. T. WESTON  2,101,117
MECHANICAL CONTROL DEVICE
Filed May 25, 1936  3 Sheets—Sheet 2

INVENTOR
Milton T. Weston

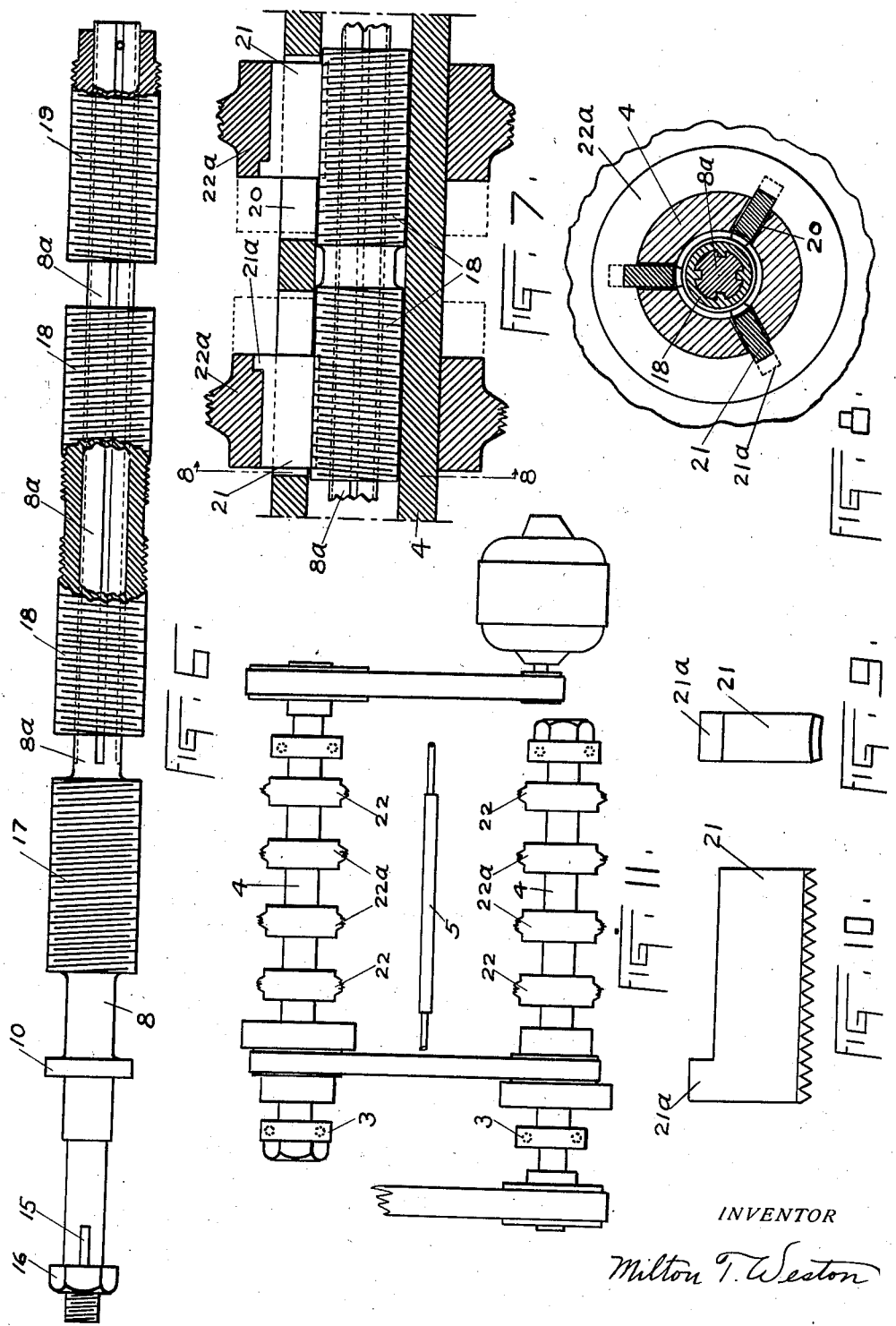

Patented Dec. 7, 1937

2,101,117

UNITED STATES PATENT OFFICE 2,101,117

MECHANICAL CONTROL DEVICE

Milton T. Weston, Keansburg, N. J.

Application May 25, 1936, Serial No. 81,597

6 Claims. (Cl. 74—393)

My invention relates to improvements in mechanical control devices and has for its principal object to provide simple, effective and positive mechanism for the axial adjustment of a plurality of machine elements which are mounted on parallel shafts adapted to revolve at the same speed or at different speeds with respect to each other. An esssential feature of my invention is the ability to axially adjust the position of the several machine elements on one or more shafts, in the same or in opposite directions with respect to each other, by equal increments at will regardless of the relative rotational speeds of the shafts.

Other objects and advantages will appear in the following specifications and are shown in the accompanying drawings in which similar reference numerals refer to like parts in all of the views.

Fig. 6 is a detail view of one of the concentric control shafts with threaded sleeve in place.

Fig. 7 is an enlarged partial longitudinal sectional view of the middle portion of one of the main shafts and shows the threaded sleeve and the co-operating threaded jaws.

Fig. 8 is a cross sectional view of one of the main shafts showing the threaded sleeve and the co-operating threaded jaws. The section is taken on a line 8—8 of Fig. 7.

Fig. 9 is an enlarged end view of one of the threaded jaws.

Fig. 10 is a side view of one of the threaded jaws.

Fig. 11 is a diagrammatic plan view intended to illustrate the operation of my mechanical control device, as in Fig. 1, when one of the main tubular shafts is driven at the same or at adjustable speeds from the other main tubular shaft.

Figure 1:
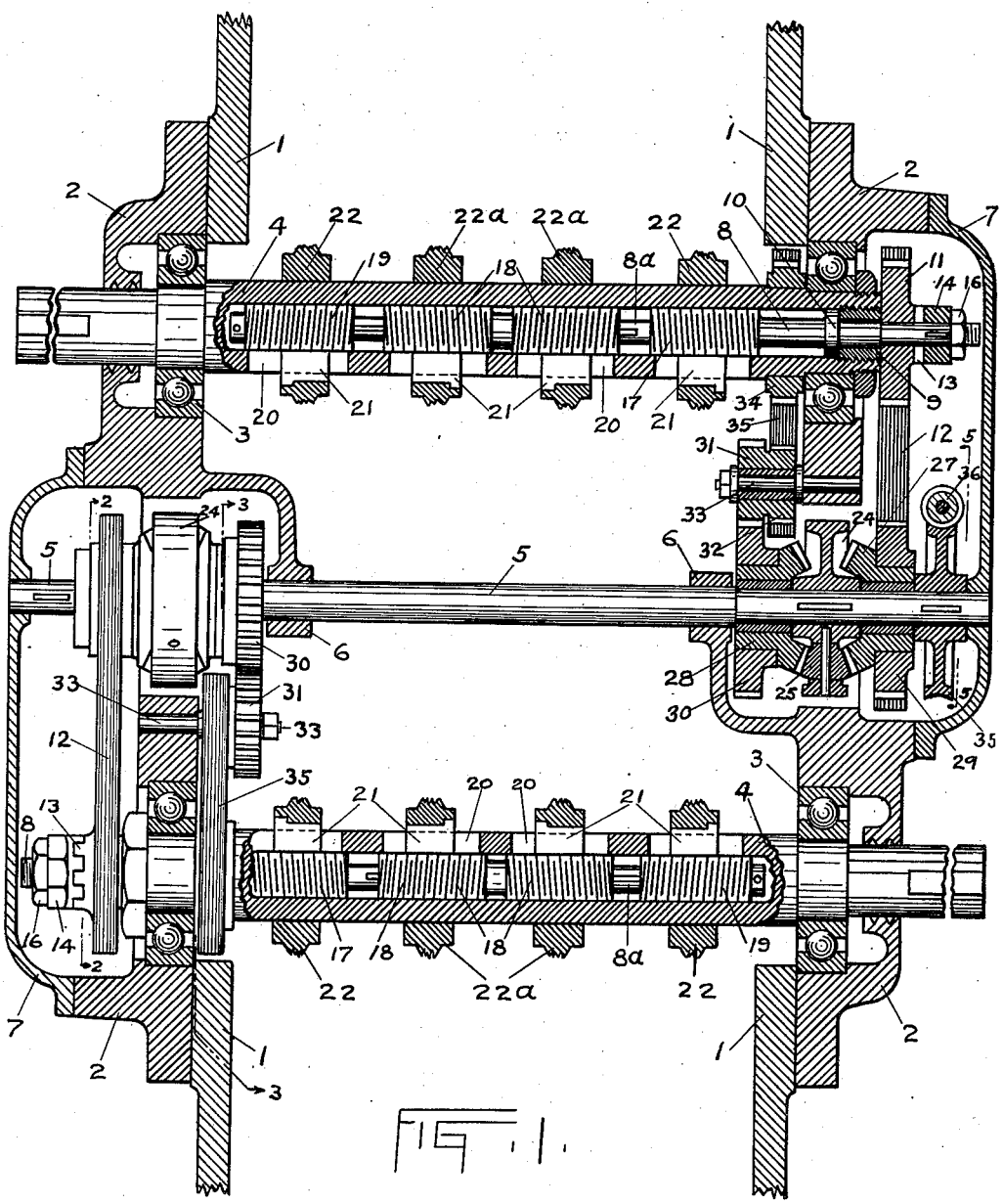
Fig. 1 is a plan view of my device. One set of control gearing is shown in plan and the other set in cross section on a line 1—1 in Figs. 2 and 3.
Figure 2:
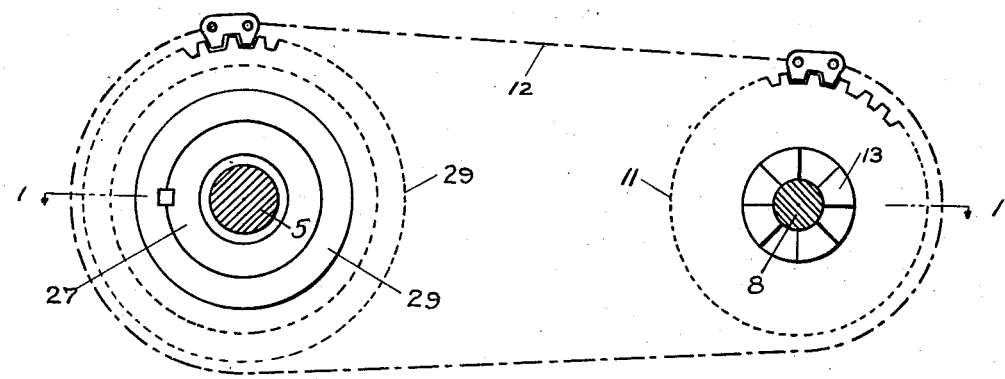
Fig. 2 is a side elevation of the silent chain drive in one of the sets of control gearing and is taken on a line 2—2 in Fig. 1.
Figure 3:
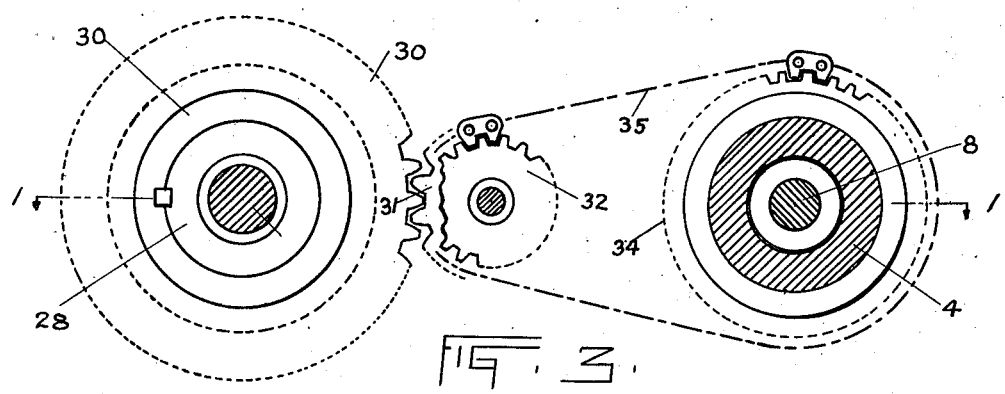
Fig. 3 is a side elevation of the reversing drive composed of both a silent chain drive and a gear and pinion. The view is taken on a line 3—3 in Fig. 1.

In carrying out my invention, in one of its forms as in Fig. 1, I show side frames 1 on which my control mechanism is mounted. Castings 2 are adapted for attachment to side frames 1 and carry all of the mechanism as follows. Anti-friction bearings 3 revolvably support the two parallel tubular shafts 4 which are identical but are mounted in opposite parallel relation bringing the driving or driven ends on opposite sides of the machine. The castings 2 are also identical but are mounted in opposite relation on opposite sides of the machine.

A relatively small shaft 5 is mounted intermediate of and parallel to the tubular shafts 4 in bracket arms 6 extending inwardly from castings 2. Both ends of intermediate shaft 5 are shown reduced in diameter and each outer end is further supported in cover castings 7 attached to supporting castings 2.

Mounted concentrically in the two tubular shafts 4 and normally revolving therewith at identical speeds but capable of independent rotation therein, are the two control shafts 8. One end of each of the control shafts 8 projects outwardly from the end of its corresponding tubular shaft 4 and is reduced in diameter where it passes thru the threaded retaining bushings 9 in the ends of the tubular shafts 4. An integral thrust collar 10 is provided on each control shaft 8 adjacent to the threaded retaining bushing 9 and prevents endwise movement of same in one direction. On the projecting end of each control shaft 8 is a sprocket wheel 11 adjacent to the outer end of the threaded retaining bushing 9 and shown to be suitable for a silent chain 12. One end of the hub of each sprocket wheel 11 is provided with square jaws 13 adapted to engage similar jaws on sliding clutch member 14. The sprocket wheel 11 is free to revolve on the control shaft 8 when not engaged by the clutch member 14 which is prevented from rotation on the control shaft 8 by a feather 15. It will be noted that the sliding clutch member 14 is square or hexagon in shape so that a wrench may be used to turn the corresponding control shaft 8 when the clutch member 14 is in the disengaged position. This enables the group of machine elements on one of the tubular shafts 4 to be adjusted axially with respect to the group of machine elements on the other tubular shaft. A nut 16 keeps the sliding clutch member 14 in engagement with the sprocket wheel 11 and also holds the sprocket wheel 11 against the end of the threaded bushing 9 which in conjunction with the integral collar 10 positively retains the control shaft 8 in fixed longitudinal relation to its corresponding tubular shaft 4.

The construction of the control shafts 8 is shown clearly in Fig. 6. An integral section 17 of the control shaft 8 next to the integral collar 16 is threaded and the remainder 8a is reduced in section and splined. A threaded sleeve 18 is slidable on the reduced section 8a but is prevented from revolving thereon by the splines. This sleeve 18 may be threaded all one hand if required but is shown threaded half one hand and half opposite hand. The end threaded section 19 is removably fixed in order that the sleeve 18 may be put in position, otherwise it could be integral with the control shaft. The outside diameter of all of the threaded sections is the same and allows them to turn freely in the tubular shafts 4.

The tubular shafts 4 are provided with openings 20 slotted longitudinally and registering with the threaded sections of the control shafts 8. In the transverse direction, as shown in Fig. 8, these slotted openings are in radical groups. In each slotted opening 20 is located a sliding jaw 21 which is threaded along its inner edge to engage a threaded section on the control shaft 8. These threaded jaws 21 are wider radially than the thickness of the wall of the tubular shafts 4 and are designed to act as keys for the machine elements represented by the fragmentary sections 22 and 22a. These machine elements may be of any nature—cams, gears, discs, etc.—and are slidable axially on the tubular shafts 4 but are prevented from rotating thereon by the key action of the threaded jaws 21. Jaws 21 are secured in the hubs of the machine elements 22 and 22a in any approved manner as by the radial lugs 21a integral with the threaded jaws 21 and cause the machine elements to move with them. Obviously any rotational movement of a control shaft 8 with respect to its corresponding tubular shaft 4 will cause the threaded jaws 21 and the machine elements 22 and 22a to move axially on the tubular shafts 4 in directions depending upon the direction of relative rotation of the control shaft 8 and also on the "hand" of the threads on the threaded sections thereof. The control shafts 8 may be constructed with all threaded sections integral or fixed. However, there may be cases when the threaded sleeve construction shown clearly in Fig. 7 may be more desirable. For example if two unequal forces are acting to move machine elements 22a together axially then the greater force can move the entire group axially until the two forces equalize each other. In other words it permits the intermediate machine elements 22a to adjust their axial positions as a unit automatically without relative rotational movement.

Figures 4, 5:
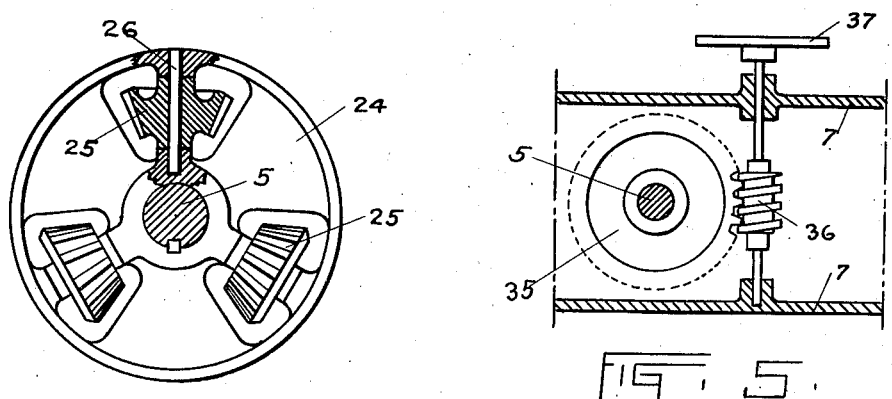
Fig. 4 is a side elevation, with partial section, of the central member of the differential keyed to the intermediate shaft.
Fig. 5 is a side elevation of the gearing used to turn and hold the intermediate shaft. The view is taken on a line 5—5 of Fig. 1.

The control mechanism is as follows: On the outer reduced ends of the intermediate shaft 5 are mounted identical differential gear sets each set composed of a central member 24 keyed on and carrying the usual bevel pinions 25 revolvable on radial shafts 26 as shown in Fig. 4. Mounted on shaft 5 adjacent to the central member 24 on each side and meshing with bevel pinions 25 are the identical bevel gears 27 and 28. On the hub of the bevel gears 27 of each set is secured a sprocket wheel 29 in line with sprocket wheel 11 and driven by the sprocket chain 12. On the hubs of bevel gears 28 are secured spur gears 30 which mesh with spur pinions 31. Spur pinions 31 are shown integral with sprocket pinions 32 and obviously they revolve as a unit on studs 33 projecting inwardly from the supporting casting 2. Each sprocket pinion 32 is in line with a driving sprocket wheel 34 on the end of the tubular shaft 4 and is driven by the sprocket chain 35. Thus it will be seen that the bevel gears 27 will be driven by the sprocket wheel 11 on control shaft 8 and bevel gear 28 will be driven by the spur gear 30, spur pinion 31 integral with sprocket wheel 32 and sprocket wheel 34 on tubular shaft 4. However, it will be clear that the inclusion of the spur gear 30 and spur pinion 31 in the driving train has the effect of reversing the direction of rotation of the bevel gear 28. Therefore bevel gears 27 and 28 will revolve in opposite directions and will also revolve at identical speeds since all driving elements are designed for this result when the tubular shafts 4 and their corresponding control shafts 8 are also revolving at identical speeds no matter what these speeds may be. Since bevel gears 27 and 28 in each group revolve at identical speeds in opposite directions there will be no rotational movement of the central member 24 or of the intermediate shaft 5 on which it is mounted. Obviously, however, the converse is true. Turning the intermediate shaft 5 and the central member 24 will cause one driving train in each group to move faster than the other train in the same group and this increase will be equal in both groups regardless of the speeds in each group. In Figs. 1 and 5 I show a simple way of manually turning the intermediate shaft 5. A worm wheel 35 is keyed on intermediate shaft 5 and meshes with a worm 36 mounted in cover casting 7. This worm 36 may be turned manually at will by means of hand wheel 37. Clearly an electric motor can be substituted for the hand wheel and thus obtain remote control.

From the foregoing it will be seen that the operation of my device is very simple and positive. In Fig. 1 I show two parallel tubular shafts 4 each of which may be independently driven at any speed. Turning the hand wheel 37 will turn the central member 24 of the differential sets which, as we have seen, causes one driving train in each group to move faster than the other train in the same group but at exactly the same increase in speed in both groups. Since the two tubular shafts are being driven their speeds will not change, therefore the relative speed of the control shafts 8 must change with respect to their corresponding tubular shaft 4 and this change will be equal. Therefore, the machine elements 22 and 22a will be moved by equal increments on both shafts simultaneously. The direction of their movements will be governed by the hand of the threads on the control shafts 8 which will depend upon requirements.

In Fig. 11 I show one tubular shaft 4 driven by a motor and the other tubular shaft 4 driven from the first one by step pulleys. However, the driven tubular shaft 4 may be driven by the machine elements on the driving shaft, if desired, in a similar manner.

From the operation of Fig. 1 it is evident that only one tubular shaft with control shaft and one differential set may be used and that it may be as long and have as many machine elements as required.

Having thus described my invention I claim as broadly new and desire to secure by Letters Patent:

1. In a mechanism of the character described the combination with revolvable parallel tubular shafts one of which may be driven from the other, of co-acting control shafts mounted interior to said tubular shafts and normally revolving therewith but capable of independent rotation therein, and positive means for rotating said co-acting control shafts independently of said tubular shafts at the same or at different rotational speeds at will.

2. In a mechanism of the character described the combination with two parallel revolvable tubular shafts, of co-acting control shafts mounted interior to said tubular shafts and normally revolving therewith but capable of independent rotation therein, an intermediate shaft normally stationary but capable of rotation at will, means for turning said intermediate shaft at will, differential means carried by said intermediate shaft, and positive belted and geared means connecting said differential means to said tubular shafts and to said co-acting control shafts whereby the relative rotational speeds of same may be changed at will.

3. In a mechanism of the character described, in combination a plurality of parallel revolvable tubular shafts, co-acting control shafts mounted interior to said tubular shafts and normally revolvable therewith at identical speeds but capable of independent rotation therein, an intermediate shaft normally stationary but capable of rotation at will, means for rotating said intermediate shaft at will, plural differential geared means carried by said intermediate shaft the central elements of said differential means being fixed on said intermediate shaft, and positive belted and geared means connecting simultaneously said differential means to said tubular shafts and to said co-acting control shafts whereby the relative rotational speeds of the latter may be changed by equal increments at will.

4. In a mechanism of the character described a plurality of parallel revolvable tubular shafts, co-acting control shafts mounted interior to said tubular shafts and normally revolving therewith at identical speeds but capable of independent rotation therein, an intermediate shaft normally stationary but capable of rotation at will, means for rotating said intermediate shaft at will, plural differential geared means carried by said intermediate shaft the central elements of same being fixed on said intermediate shaft, and positive operable means, one of which in each group is reversing, connecting the outer elements of said differential geared means to said tubular shafts and to said co-acting control shafts whereby the relative rotational speeds of the latter may be altered by substantially equal increments independent of the relative rotational speeds of all of said shafts.

5. In a mechanism of the character described the combination with a plurality of machine elements, of a revolvable tubular power shaft on which said machine elements are mounted for axial movement thereon said tubular power shaft having a series of substantially radial longitudinal openings spaced apart axially, a co-acting control shaft mounted interior to said tubular power shaft and normally revolvable therewith at identical speed but capable of independent rotation therein said control shaft having a series of threaded sections registering with the openings in the said tubular power shaft, jaws extending thru the openings in said tubular power shaft and engaging simultaneously the said machine elements and the corresponding threaded sections of said control shafts whereby the said machine elements are moved axially by any difference in rotational movement between the said tubular power shaft and the said co-acting control shaft, and trains of positively connected elements, including a differential, engaging simultaneously the said tubular power shaft and the said co-acting control shaft to effect a difference in rotational movement between them at will.

6. In a mechanism of the character described the combination with a plurality of machine elements, of a revolvable tubular power shaft on which some of said machine elements are mounted for axial movement thereon said tubular power shaft having a series of longitudinal openings spaced apart axially, another revolvable tubular shaft on which other machine elements are mounted for axial movement thereon said tubular shaft having a series of longitudinal openings spaced apart axially said tubular shaft being parallel to and driven by said tubular power shaft, a co-acting control shaft mounted interior to each of said tubular shafts and normally revolvable therewith but capable of independent rotation therein said control shafts having threaded sections registering with the openings in said tubular shafts, jaws extending thru the openings in said tubular shafts and engaging simultaneously the threaded sections of the control shafts and the hubs of the machine elements whereby the latter are moved axially by any difference in rotational movement between the said tubular shafts and their co-acting control shafts, and positive mechanical elements connecting simultaneously both tubular shafts and their corresponding control shafts to effect an equal change in rotational movement of the said control shafts independent of the relative rotational speeds of the said tubular shafts.

MILTON T. WESTON.